US008942184B2

(12) United States Patent
Medapalli et al.

(10) Patent No.: US 8,942,184 B2
(45) Date of Patent: Jan. 27, 2015

(54) METHOD AND APPARATUS FOR LINK ADAPTATION IN A WIRELESS COMMUNICATION NETWORK

(75) Inventors: Kameswara Medapalli, Santa Clara, CA (US); Djordje Tujkovic, Santa Clara, CA (US); Kamlesh Rath, Santa Clara, CA (US); Louay Jalloul, Santa Clara, CA (US); Bertrand Hochwald, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1122 days.

(21) Appl. No.: 12/456,471

(22) Filed: Jun. 16, 2009

(65) Prior Publication Data

US 2009/0310550 A1 Dec. 17, 2009

Related U.S. Application Data

(60) Provisional application No. 61/132,364, filed on Jun. 17, 2008.

(51) Int. Cl.
*H04W 4/00* (2009.01)
*H04W 28/18* (2009.01)
*H04W 40/12* (2009.01)

(52) U.S. Cl.
CPC .............. *H04W 28/18* (2013.01); *H04W 40/12* (2013.01)
USPC .......................................... 370/329; 370/332

(58) Field of Classification Search
CPC ..................................................... H04W 40/12
USPC ................................................. 370/329, 465
See application file for complete search history.

(56) References Cited

U.S. PATENT DOCUMENTS

| | | | |
|---|---|---|---|
| 2004/0132496 A1* | 7/2004 | Kim et al. | 455/562.1 |
| 2005/0053038 A1* | 3/2005 | Kimura | 370/333 |
| 2005/0128976 A1* | 6/2005 | Uehara et al. | 370/329 |
| 2007/0280183 A1* | 12/2007 | Cho et al. | 370/338 |
| 2008/0102879 A1* | 5/2008 | Heo et al. | 455/522 |
| 2008/0107215 A1* | 5/2008 | Nibe | 375/346 |
| 2008/0311888 A1 | 12/2008 | Ku et al. | |
| 2010/0157829 A1* | 6/2010 | Jonsson et al. | 370/252 |
| 2010/0232526 A1* | 9/2010 | Tidestav | 375/259 |

* cited by examiner

*Primary Examiner* — Brandon Renner
(74) *Attorney, Agent, or Firm* — Sterne, Kessler, Goldstein & Fox P.L.L.C.

(57) ABSTRACT

A method and apparatus for link adaptation in a wireless communication network is provided. The method includes computing a first channel quality parameter based on one or more channel quality parameters. The one or more channel quality parameters are associated with a communication link between a Mobile Station (MS) and a Base Station (BS). The method further includes determining a qualifying transmission unit to compute a correction parameter. The correction parameter is computed based on the first channel quality parameter and one or more transmission parameters. The one or more transmission parameter is associated with the communication link. Thereafter, the method schedules a transmission mode of the communication link based on a second channel quality parameter. The second channel quality parameter is estimated based the first channel quality parameter and the correction parameter.

32 Claims, 5 Drawing Sheets

US 8,942,184 B2

METHOD AND APPARATUS FOR LINK ADAPTATION IN A WIRELESS COMMUNICATION NETWORK

This application claims the benefit of U.S. Provisional Application No. 61/132,364, filed Jun. 17, 2008.

FIELD OF THE INVENTION

The present invention relates generally to wireless communication networks. More specifically, the invention relates to a method and apparatus for link adaptation in a wireless communication network.

BACKGROUND OF THE INVENTION

Nowadays nature of data carried over a wireless communication network requires highly determinative architecture for good quality, efficient, and reliable communications. Each Mobile Station (MS) require different Quality of Service (QoS) to deal with different type of traffic for different type of communication technologies such as, Worldwide Interoperability Microwave Access (WiMAX) technology, Wireless Local Area Network (WLAN) technology, and Wireless Metropolitan Area Network (WMAN) technology. For example, a MS requires different QoS for voice and data packets. The architectures required for communicating the voice packets and data packets differ greatly in terms of design consideration in the wireless communication network. As a result, maintaining required QoS for each MS is one of the various problems encountered by a Base Station (BS) in the wireless communication network.

In the existing technologies, usually a MS reports a channel quality parameter to the BS as a performance feedback for a packet received. However, this channel quality parameter is associated only with a downlink between the MS and the BS rather than an uplink. The channel quality parameter may be a Physical Carrier to Interference and Noise Ratio (PCINR) value and an Effective Carrier to Interference and Noise Ratio (ECINR) value. A PCINR value does not provide an actual estimate of conditions of a communication link in the wireless communication network. Further, the PCINR value does not indicate whether the MS is able to decode the received packet or not.

Further, in the case of an ECINR value, a BS uses the ECINR value to predict Modulation and Coding Scheme (MCS) associated with the downlink. However, the ECINR value does not provide QoS specific information to the BS. In the wireless communication network, the BS receives channel quality parameters from multiple MSs served by the BS. Each of the multiple MSs may have different QoS requirements. Hence, reporting ECINR values for the QoS requirements of the multiple MSs in a more frequent manner results in an increase in signaling overhead. Further, determining MCS from the ECINR values more frequently also results in complex computation at the MS.

Therefore, there is a need for a method and system for link adaptation in a wireless communication network to incorporate QoS parameters.

BRIEF DESCRIPTION OF DRAWINGS

A more complete description of the invention is provided by reference to the following detailed description when considered in conjunction with the accompanying drawings in which reference symbols indicate the same or similar components, wherein.

DETAILED DESCRIPTION OF THE DRAWINGS

Figure 1:
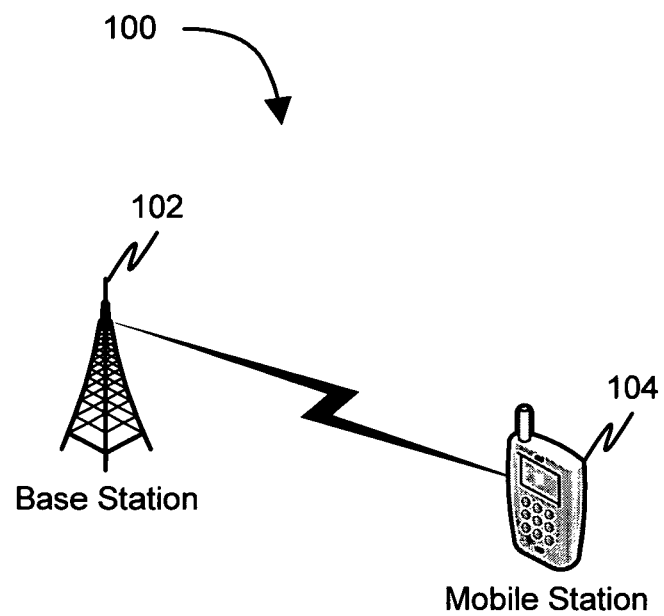
FIG. 1 is a block diagram showing a wireless communication network in which various embodiments of the invention can function.

Before describing in detail embodiments that are in accordance with the invention, it should be observed that the embodiments reside primarily in combinations of method steps and apparatus components related to a method and apparatus for link adaptation in wireless communication network. accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of method and apparatus for communication in a wireless communication system. The non-processor circuits may include, but are not limited to, a radio receiver, a radio transmitter, signal drivers, clock circuits, power source circuits, and user input devices.

Generally speaking pursuant to various embodiments, provides method and apparatus for link adaptation in a wireless communication network. The method includes computing a first channel quality parameter based on one or more channel quality parameters associated with a communication link between a Mobile Station (MS) and a Base Station (BS) at a predefined interval. The method further includes determining a qualifying transmission unit to compute a correction parameter based on the first channel quality parameter and one or more transmission parameters. The one or more transmission parameters are associated with the communication link.

Additionally, the method includes scheduling a transmission mode of the communication link based on a second channel quality parameter. The second channel quality parameter is estimated based on the first channel quality parameter and the correction parameter.

FIG. 1 is a block diagram showing a wireless communication network 100 in which various embodiments of the invention can function. Examples of wireless communication network 100 may include, but are not limited to, a Worldwide Interoperability for Microwave Access (WiMAX) communication network, a 3rd Generation Partnership Project (3GPP) network including 3GPP Long Term Evolution (LTE) network, a 3rd Generation Partnership Project 2 (3GPP2) network including 3GPP2 Ultra Mobile Broadband (UMB) network, a Wireless Fidelity (WiFi) network, and any variant of Orthogonal Frequency Division Multiple Access (OFDMA) communication network.

Wireless communication network 100 includes a Base Station (BS) 102 communicating with a Mobile Station (MS) 104. Examples of MS 104 may include, but are not limited to a Personal Digital Assistant (PDA), a mobile phone, a laptop, and a personal computer. BS 102 and MS 104 communicate with each other through a communication link. The communication link is one of a DownLink (DL) and an UpLink (UL). For example, BS 102 transmits data to MS 104 over a DL. Whereas, MS 104 transmits data to BS 102 over an UL. MS 104 may transmit channel quality parameters associated with a DL, to BS 102. The channel quality parameters may be transmitted at predefined intervals. Similarly, BS 102 may have a channel quality parameters associated with a UL. A channel quality parameter may indicate a quality associated with a DL. The channel quality parameter may be for example, but are not limited to a Physical Carrier to Interference and Noise Ratio (PCINR), an Effective CINR (ECINR), a Carrier-to-Interference Ratio (CIR), a Carrier-to-Noise Ratio (CNR).

Figure 2:
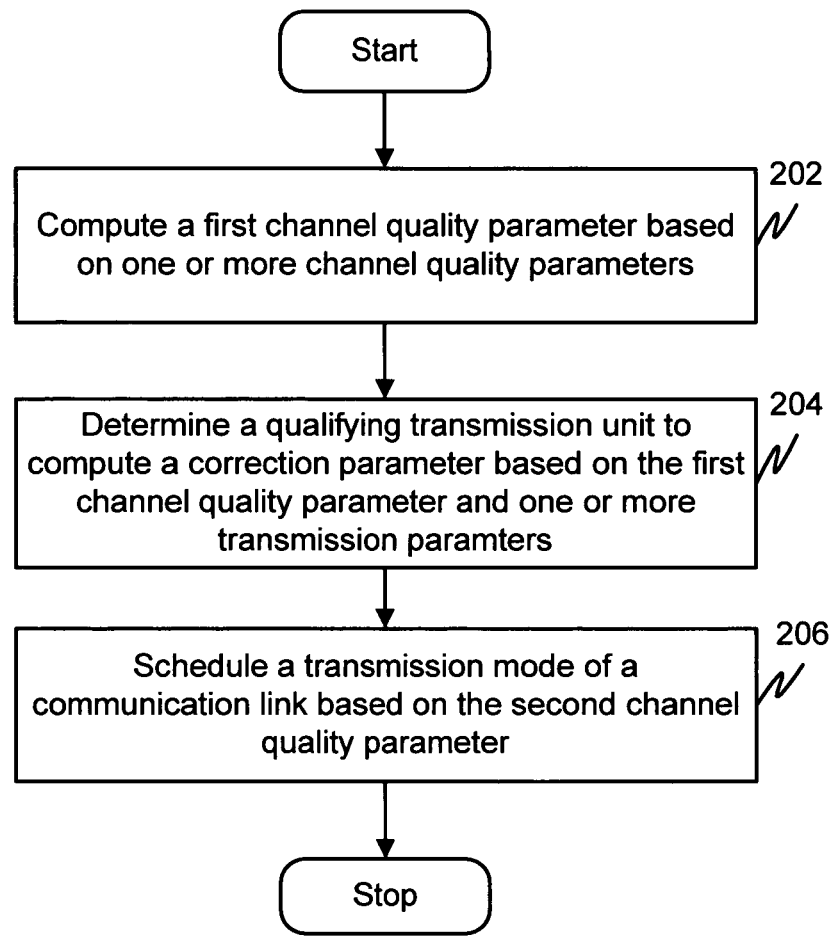
FIG. 2 is a flow chart illustrating a method for link adaptation in wireless communication network, in accordance with an embodiment of the invention.

FIG. 2 is a flow chart illustrating a method for link adaptation in wireless communication network 100, in accordance with an embodiment of the invention. In wireless communication network 100, link adaptation is performed considering a Quality of Service (QoS) associated with communication links between BSs and MSs. At step 202, a first channel quality parameter is computed based on one or more channel quality parameters at a predefined interval. The one or more channel quality parameters are associated with a communication link between a MS and a BS. Examples of the first channel quality parameter and the one or more channel quality parameters may include, but are not limited to a Physical Carrier to Interference and Noise Ratio (PCINR), an Effective CINR (ECINR), a Carrier-to-Interference Ratio (CIR), and a Carrier-to-Noise Ratio (CNR). For example, a first channel quality parameter may be computed based on previous channel quality parameters associated with a DL transmitted by MS 104 to BS 102.

In an embodiment of the invention, the first channel quality parameter may be computed based on one or more of estimated mobility of the MS and quality of the communication link. In one instance, the first channel quality parameter may be an average of the one or more channel quality parameters. The one or more channel quality parameters are averaged by an averaging parameter to compute the first channel quality parameter. The averaging parameter may be dependent upon one or more of the estimated mobility of the MS and the quality of the communication link. For example, an average PCINR value is computed based on previous PCINR values associated with a DL between MS 104 and BS 102 and an averaging parameter. The averaging parameter is computed based on estimated mobility of MS 104 and quality of the DL.

The mobility of the MS may be estimated based on one or more pilots transmitted over the communication link. If the communication link is a DL, one or more pilots transmitted by the BS are received by the MS. For example, in a WiMAX communication network, a preamble is transmitted by BS 102 to MS 104 for system synchronization. The preamble is a set of pilot symbols known to MS 104. In the DL, additional pilots are transmitted along with data symbols. The MS may estimate the mobility based on energy associated with the one or more pilots received by the MS. Alternatively, if the communication link is an UL, one or more pilots transmitted by the MS are received by the BS. The one or more pilots include a set of pilot symbols along with data symbols. Thereafter, the BS may estimate the mobility based on energy associated with the one or more pilots received by the BS.

In response to the computation of the first channel quality parameter, a qualifying transmission unit is determined at step 204. Examples of the qualifying transmission unit may include, but are not limited to a qualifying transmission block, a qualifying transmission burst, and a qualifying transmission packet. The qualifying transmission unit is determined to compute a correction parameter. For example, a qualifying transmission packet transmitted over a DL between MS 104 and BS 102 is determined to compute a correction parameter. A method of determining the qualifying transmission unit is explained in detail in conjunction with FIG. 3.

In an embodiment of the invention, correction parameter is computed based on the first channel quality parameter and one or more transmission parameters. The correction parameter indicates an amount of variation that may be made in the first channel quality parameter. The variation in the first channel quality parameter is explained in detail in conjunction with FIG. 3.

The one or more transmission parameters are associated with the communication link. Examples of a transmission parameter of the one or more transmission parameter may include, but are not limited to a target error performance associated with the communication link, a QoS requirement for the communication link, a type of communication, an Automatic Repeat Request (ARQ) parameter for the communication link, a Hybrid ARQ (HARQ) parameter for the communication link, an error rate associated with a transmission unit transmitted over the communication link, and a size of the transmission unit. The transmission unit may be one of a transmission burst, a transmission packet, and a transmission block. For example, the correction parameter corresponding to a qualifying transmission packet transmitted through a DL may be computed based on an average PCINR value, a size of the qualifying transmission packet, a QoS requirement for the DL and a type of communication.

A transmission parameter of the one or more transmission parameters may be associated with one of a voice connection, a video connection, and a data connection. For example, a communication link between BS 102 and MS 104 may be associated with a voice connection. In this case, a qualifying transmission packet transmitted over the communication link may be a voice packet. However, it will be apparent to a person skilled in the art that the transmission parameter may be associated with any other type of connection known in the art.

Referring back to the correction parameter, the correction parameter may be computed based on the first channel quality parameter and an error rate related to the communication link. The error rate may be one of a burst error rate, a packet error rate, and a block error rate. For example, a correction parameter is computed based on an average PCINR value and a packet error rate. The error rate is associated with a channel quality parameter of the one or more channel quality parameters. The relationship between the error rate and the channel quality parameter is determined based on an error rate table. It will be apparent to a person skilled in the art that the error rate table may be replaced by a mathematical equation. The correction parameter may be an offset to the first channel quality parameter in the error rate table. For example, an average PCINR value is 20 dB and a correction parameter is 4 dB. The correction parameter of 4 dB is an offset to the average PCINR value of 20 dB. The offset may be one of an increment and a decrement to the average PCINR value of 20 dB. This is further explained in detail in conjunction with FIG. 3.

Thereafter at step 206, a transmission mode of the communication link is scheduled based on a second channel quality parameter. The transmission mode includes one or more of a Modulation and Coding Scheme (MCS), a repetition rate, and a spatial rate. Further, examples of the second channel quality parameter may include, but are not limited to a PCINR, an ECINR, a CIR, and a CNR. The second channel quality parameter is estimated based on the first channel quality parameter and the correction parameter. In an embodiment of the invention, the second channel quality parameter may be estimated by offsetting the first channel quality parameter by the correction parameter.

Further, the transmission mode is scheduled by selecting a transmission mode corresponding to the second channel quality parameter. The transmission mode may be selected from a predefined table. The predefined table indicates a transmission mode corresponding to various channel quality parameters. It will apparent to a person skilled in the art the predefined table is a table known in the art.

For example, a first channel quality parameter is 20 dB and a correction parameter is 4 dB. The first channel quality parameter may be an average of previous channel quality parameters such as PCINR values associated with a DL between MS 104 and BS 102. A second channel quality parameter is determined as 16 dB by decreasing the first channel quality parameter of 20 dB by the correction parameter of 4 dB. Thereafter, a transmission mode corresponding to the second channel quality parameter of 16 dB is selected from a predefined table. The predefined table indicates a MCS, a repetition rate, and a spatial rate corresponding to the second channel quality parameter of 16 dB. Then, communication is scheduled for the DL based on the determined transmission mode.

The above-mentioned method enables link adaptation in the wireless communication network. This method performs link adaptation by considering the QoS requirements required by each MS of the wireless communication networks. Further, this method reduces the amount feedbacks from a MS thereby eliminating signaling overhead on a BS. Such reduced amount feedbacks also reduces the computing complexity and computing overhead in the MS.

Figure 3:
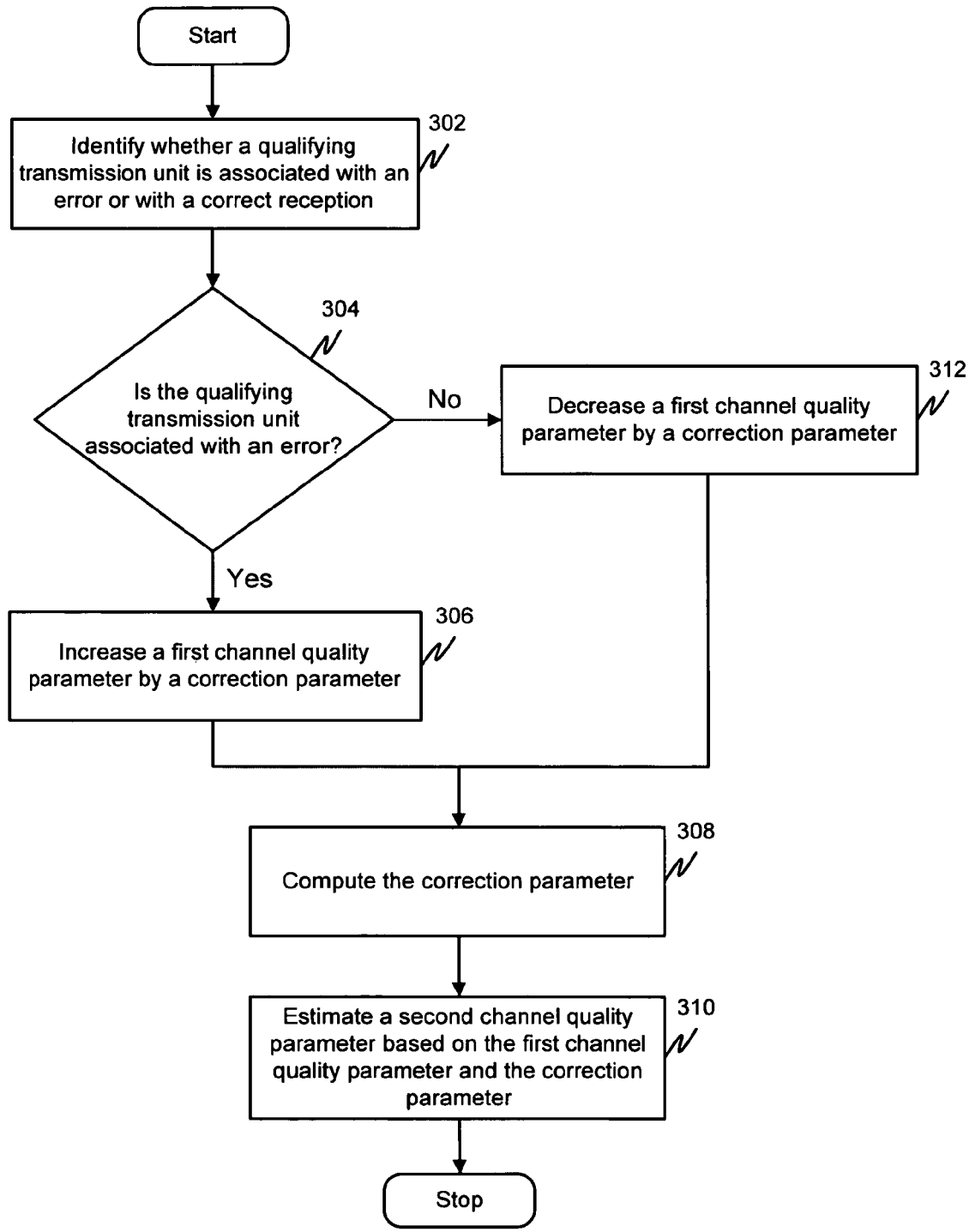
FIG. 3 is a flowchart illustrating a method for determining a second channel quality parameter in wireless communication network, in accordance with an embodiment of the invention.

FIG. 3 is a flowchart illustrating a method for determining a second channel quality parameter in wireless communication network 100, in accordance with an embodiment of the invention. At step 302, it is identified whether the qualifying transmission unit is associated with an error or with a correct reception. For example, a qualifying transmission unit transmitted by BS 102 is associated with an error when MS 104 does not receive the qualifying transmission unit correctly. Further, a qualifying transmission unit transmitted by BS 102 is associated with a correct reception when MS 104 receives the transmission unit correctly. A qualifying transmission unit may be a transmission unit that indicates whether a first channel quality parameter needs to be varied using the correction parameter. If transmission units transmitted over a period of time is not identified as a qualifying transmission unit then correction parameters previously computed may be deleted. The deleted correction parameters are stale parameters that may not be used.

In an embodiment of the invention, the qualifying transmission unit is identified as associated with the error or with the correct reception based on a Cyclic Redundancy Check (CRC) computed on the qualifying transmission unit. Alternatively, the qualifying transmission unit is identified as associated with the error or with the correct reception based on a quality associated with a decoded qualifying transmission unit. For example, a decoder at MS 104 decodes a qualifying transmission unit transmitted over a DL. Based on quality of output of the decoder, MS 104 may identify that the qualifying transmission unit is associated with an error.

At step 304, a check is performed to determine if the qualifying transmission unit is associated with an error. If the qualifying transmission unit is associated with the error, a need for increasing the first channel quality parameter is identified. Thereafter at step 306, the first channel quality parameter is increased by the correction parameter to estimate the second channel quality parameter. The first channel quality parameter is increased when a qualifying signal parameter associated with the qualifying transmission unit is lower than or equal to a signal parameter associated with one of one or more channel quality parameters. The one or more channel quality parameters may be previous channel quality parameters associated with the communication link. This is explained in detail in conjunction with FIG. 2. Examples of the qualifying signal parameter and the signal parameter may include, but are not limited to, one or more of a spectral efficiency, a transmission mode, a burst size, a packet size, and a block size.

Thus, the first channel quality parameter is increased when a Modulation and Coding Scheme (MCS) associated with a qualifying transmission unit is lower than or equal to a MCS associated with a channel quality parameter of the one or more channel quality parameters. The channel quality parameter may be related to a target error rate. The target error rate associated with the channel quality parameter may be identified from the error rate table as discussed earlier. The target error rate may be a desired error rate for a transmission unit to be transmitted over the communication link.

In another scenario, the first channel quality parameter is increased when a size of a qualifying transmission unit is lower than or equal to a size of a transmission unit transmitted previously. The transmission unit may be transmitted using a MCS associated with a channel quality parameter of the one or more channel quality parameters. The qualifying transmission unit may be transmitted using a MCS higher that the MCS associated with the channel quality parameter of the one or more channel quality parameters.

For example, a transmission unit of size 100 bytes is transmitted by BS 102 using a MCS associated with a DL. The MCS used by BS 102 is lower than or equal to a MCS of a previously determined transmission unit for the DL, and the size of the transmission unit (i.e. 100 bytes) is lower than or equal to size of a reference transmission unit (i.e. 1000 bytes). The size of the transmission unit and the reference transmission unit are known to MS 104 and BS 102. Thereafter, if BS 102 determines that the transmission unit is received with an error, BS 102 increases the first channel quality parameter by a correction parameter.

In response to identifying a need for increasing the first channel quality parameter, the correction parameter is computed at step 308. The correction parameter may be computed based on the qualifying transmission unit between a MS and a BS. The correction parameter is computed based on a first channel quality parameter and one or more transmission parameters. The computation of the correction parameter is explained in detail in conjunction with FIG. 2.

Subsequently, a second channel quality parameter is estimated based on the correction parameter and a first channel quality parameter at step 310. The second channel quality parameter may be estimated by increasing the first channel quality parameter by the correction parameter.

Referring back to step 304, if the qualifying transmission unit is associated with a correct reception, a need for decreasing the first channel quality parameter is identified. Thereafter, the first channel quality parameter is decreased by the correction parameter at step 312 to estimate the second channel quality parameter. The first channel quality parameter is decreased when a qualifying signal parameter associated with the qualifying transmission unit is higher than or equal to a signal parameter associated with one of one or more channel quality parameters.

The first channel quality parameter is decreased when a size of a qualifying transmission unit is greater than or equal to a target size of a transmission unit decided. Further, a MCS selected for transmitting the qualifying transmission unit may be higher than a MCS associated with a channel quality parameter of the one or more channel quality parameters.

For example, BS 102 transmits a transmission unit of 1000 bytes using a selected MCS higher than a MCS associated with one of the one or more channel quality parameters. In this case, the transmission unit transmitted has a size greater than a target size of 100 bytes decided by BS 104. Thereafter, if MS 104 receives the transmission unit of 1000 bytes correctly it is inferred that the transmission unit of 100 bytes if transmitted will be correctly received. Thus, the first channel quality parameter is decreased by a correction parameter.

For example, BS 102 transmits a transmission unit of size 1000 bytes using a MCS associated with a DL. The MCS used by BS 102 is higher than or equal to a MCS of a previously determined transmission unit for the DL, and the size of the transmission unit (i.e. 1000 bytes) is higher than or equal to size of a reference transmission unit (i.e. 100 bytes). The size of the transmission unit and the reference transmission unit are known to MS 104 and BS 102. Thereafter, if BS 102 determines that the transmission unit is correctly received, BS 102 decreases the first channel quality parameter by a correction parameter.

Further at step 308, the correction parameter is computed. The computation of the correction parameter is explained in detail in previous paragraph. In response to the computation, a second channel quality parameter is estimated based on the correction parameter and a first channel quality parameter at step 310. The second channel quality parameter may be estimated by increasing the first channel quality parameter by the correction parameter.

Figure 4:
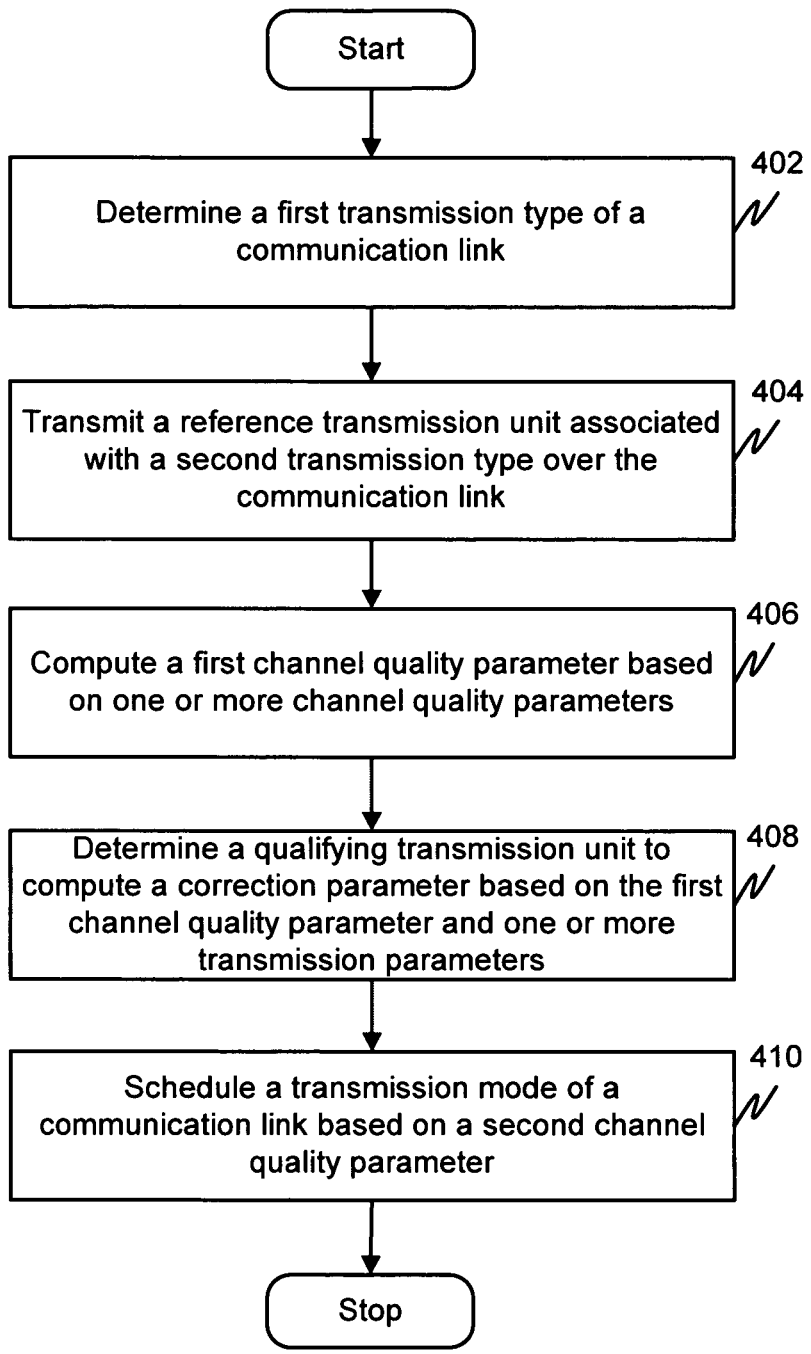
FIG. 4 is a flowchart of a method for link adaptation in a wireless communication network, in accordance with another embodiment of the invention.

FIG. 4 is a flowchart of a method for link adaptation in a wireless communication network 100, in accordance with another embodiment of the invention. Wireless communication network 100 may be a Multiple Input Multiple Output (MIMO) type. At step 402, a first transmission type of a communication link is determined. The first transmission type may be used over a predefined time period. The communication link is between a MS and a BS. The first transmission type is one of a spatial multiplexing type and a Space Time Block Coding (STBC) type. For example, a BS determines that the most recently scheduled DL is of STBC type. However, it will be apparent to a person is skilled in the art that the first transmission type may be any other transmission types known in the art.

Subsequently at step 404, a reference transmission unit associated with a second transmission type is transmitted over the communication link. The reference transmission unit may be a smallest transmission unit. The reference transmission unit may be one of a reference burst, a reference packet, and a reference block. The reference transmission unit is associated with a second transmission type. The second transmission type is one of a spatial multiplexing type and a STBC type. However, it will be apparent to a person is skilled in the art that the second transmission type may be any other transmission types known in the art. For example, a BS 102 transmits a reference packet of a spatial multiplexing type based on the determination that the most recently scheduled DL is of a STBC type.

In response to transmitting the reference transmission unit, a first channel quality parameter is computed at step 406. The first channel quality parameter is computed based on one or more channel quality parameters at a predefined interval. The one or more channel quality parameters may be obtained in response to the reference burst transmitted. The first channel quality parameter may be computed based on one or more of estimated mobility of the MS and quality of the communication link. Additionally, the first channel quality parameter may be an average of the one or more channel quality parameters. Thus, the first channel quality parameter may be an average value computed for the reference packet of the spatial multiplexing type.

For example, a burst may be transmitted by BS 102 using a spatial multiplexing type to MS 104 for a predefined time period. In this case, BS 102 receives PCINR values associated with the spatial multiplexing type of transmission for the burst transmitted. However, BS 102 may not have knowledge related to receiving sensitivity of MS 104 for burst associated with a STBC transmission type. Hence, BS 102 transmits a reference burst of the STBC type to MS 104. In response to the transmission of the reference burst, BS 102 may receive PCINR values for STBC type of transmission. Based on these PCINR values, BS 102 computes an average PCINR value for the STBC type of transmissions.

The inclusion of reference transmission unit enables a BS to have channel quality parameters associated with the first and second transmission types frequently. These channel quality parameters enable BS to be aware of a receiving sensitivity of MS 104 for transmission units associated with both first and second transmission types. Moreover, transmitting transmission units of both first and second transmission types in a single transmission session results in reduced number of feedbacks thereby limiting a signaling overhead in the communication link i.e. uplink.

In response to computing the first channel quality parameter, a qualifying transmission unit is determined at step 408. The qualifying transmission unit is determined to compute a correction parameter. The correction parameter is computed based on the first channel quality parameter and one or more transmission parameters. This is explained in detail in conjunction with FIG. 2.

At step 410, a transmission mode of the communication link is scheduled based on a second channel quality parameter. The second channel quality parameter is estimated based on the first channel quality parameter and the correction parameter. The transmission mode includes one or more of a Modulation and Coding Scheme (MCS), a repetition rate, and a spatial rate. In an embodiment of the invention, the transmission mode is scheduled by selecting a transmission mode corresponding to the second channel quality parameter. This is explained in detail in conjunction with FIG. 2.

Figure 5:
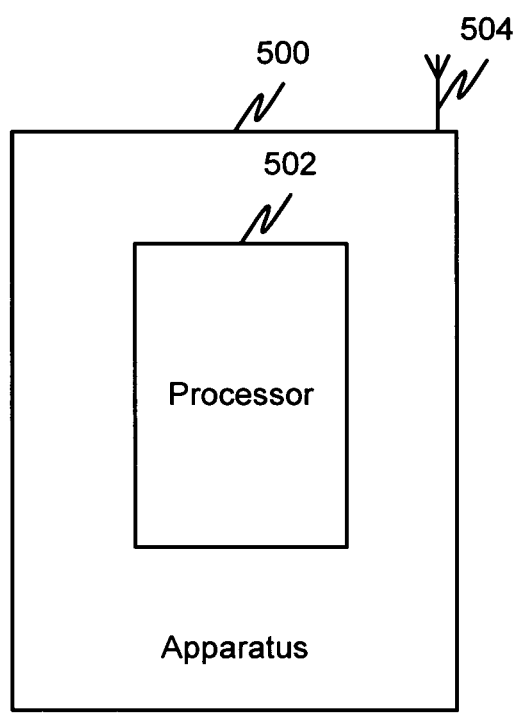
FIG. 5 is a block diagram illustrating an apparatus for link adaptation in a wireless communication network, in accordance with an embodiment of the invention.

FIG. 5 is a block diagram illustrating an apparatus 500 for link adaptation in a wireless communication network in accordance with an embodiment of the invention. Apparatus 500 may be a Base Station (BS). Further, apparatus 500 is connected to a MS using a communication link. The communication link may be one of a DL and an UL.

Apparatus 500 includes a processor 502 and a transceiver 504. Examples of processor 402 may include, but are not limited to a Central Processing Unit (CPU), a microprocessor, a controller, and a Digital Signal Processor (DSP). Processor 502 computes a first channel quality parameter based on one or more channel quality parameters. The one or more channel quality parameters are associated with the communication link at a predefined interval. This has been explained in detail in conjunction with FIG. 2.

In an embodiment of the invention, the wireless communication network may be a MIMO type. In this case, processor 502 determines a first transmission type of the communication link. The first transmission type may be used over a predefined time period. The first transmission type is one of a spatial multiplexing type and a STBC type. Thereafter, transceiver 504 may transmit a reference transmission unit over the communication link. The reference transmission unit is associated with a second transmission type. The second transmission type is one of a spatial multiplexing type and a STBC type. In response to the reference transmission unit transmitted, transceiver 504 receives one or more channel quality parameters. Processor 502 computes a first channel quality parameters based on the one or more channel quality parameters. The first channel quality parameter may be associated with the second transmission type. This has been explained in detail in conjunction with FIG. 4.

In response to computing the first channel quality parameter, processor 502 determines a qualifying transmission unit. The qualifying transmission unit is transmitted by transceiver 504 to the MS over the communication link. The qualifying transmission unit is determined to compute a correction parameter. The correction parameter is computed based on the first channel quality parameter and one or more transmission parameters. The one or more transmission parameters are associated with the communication link. The process of determining the qualifying transmission unit and correction parameter is explained in detail in conjunction with FIGS. 2 and 3.

Thereafter, processor 502 may identify whether the qualifying transmission unit is associated with an error or with a correct reception. If the qualifying transmission unit is associated with the error, processor 502 identifies a need for increasing the first channel quality parameter. Thus, processor 502 may increase the first channel quality parameter by the correction parameter to estimate a second channel quality parameter. The first channel quality parameter is increased when a qualifying signal parameter associated with the qualifying transmission unit is lower than or equal to a signal parameter associated with one of the one or more channel quality parameters. The one or more channel quality parameters may be previous channel quality parameters associated with the communication link. Examples of the qualifying signal parameter and the signal parameter may include, but are not limited to, one or more of a spectral efficiency, a transmission mode, a burst size, a packet size, and a block size. This is explained in detail in conjunction with FIG. 3. Thereafter, processor 502 schedules a transmission mode of the communication link based on the second channel quality parameter. In an embodiment of the invention, the transmission mode is scheduled for the second transmission type.

Alternatively, if the qualifying transmission unit is associated with a correct reception, processor 502 identifies a need for decreasing the first channel quality parameter. Thus, processor 502 may decrease the first channel quality parameter by the correction parameter to estimate a second channel quality parameter. The first channel quality parameter is decreased when a qualifying signal parameter associated with the qualifying transmission unit is higher than or equal to a signal parameter associated with one of the one or more channel quality parameters. The one or more channel quality parameters may be previous channel quality parameters associated with the communication link. Examples of the qualifying signal parameter and the signal parameter may include, but are not limited to, one or more of a spectral efficiency, a transmission mode, a burst size, a packet size, and a block size. This has been explained in detail in conjunction with FIG. 3. Thereafter, processor 502 schedules a transmission mode of the communication link based on the second channel quality parameter. In an embodiment of the invention, the transmission mode is scheduled for the second transmission type.

Various embodiments of the invention provide method and apparatus for link adaptation in a wireless communication network. The link adaptation in the wireless communication network is performed by a Base Station (BS) considering the QoS requirements required for each MS. The QoS requirements are dependent upon the type of connection, such as voice connection, data connection and video connection, existing between the BS and a MS. As a result, the link adaptation is also dependent upon the type of connection. Further, the BS computes the first channel quality parameters from one or more channel quality parameters received from the MS. Hence, computation complexity at the MS is avoided. Moreover, the MS need to send only the channel quality parameters to the BS thereby reducing the feedbacks from the MS. Thus, signaling overhead in a communication link between the BS and the MS is reduced. Moreover, the BS transmits a reference transmission unit of different types of transmission types in a single transmission session to the MS. This enables the BS to be aware of receiving sensitivity of the MS for transmission units of these transmission types based on less number of feedbacks from the MS. Such less feedbacks results in reduced signaling overhead in the communication link.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for link adaptation in a wireless communication network, the method comprising:
  computing a first channel quality parameter based on at least one channel quality parameter associated with a communication link between a Mobile Station (MS) and a Base Station (BS) at a predefined interval;

identifying and transmitting a qualifying transmission unit via the communications link;

upon an indication of the qualifying transmission unit, computing a correction parameter based on the first channel quality parameter and at least one transmission parameter, wherein the at least one transmission parameter is associated with the communication link; and scheduling a transmission mode of the communication link based on a second channel quality parameter, wherein the second channel quality parameter is estimated based on the first channel quality parameter and the correction parameter.

2. The method of claim 1, wherein the first channel quality parameter is computed based on at least one of estimated mobility of the MS and quality of the communication link.

3. The method of claim 1, wherein the qualifying transmission unit is one of a qualifying transmission block, a qualifying transmission burst, and a qualifying transmission packet.

4. The method of claim 1, wherein determining the qualifying transmission unit further comprises identifying whether the qualifying transmission unit is associated with an error or with a correct reception.

5. The method of claim 4, wherein the qualifying transmission unit is identified as associated with the error or with the correct reception based on one of:
a Cyclic Redundancy Check (CRC) computed on the qualifying transmission unit; and
a quality associated with a decoded qualifying transmission unit.

6. The method of claim 4, farther comprising increasing the first channel quality parameter by the correction parameter to estimate the second channel quality parameter when the qualifying transmission unit is associated with the error, wherein a qualifying signal parameter associated with the qualifying transmission unit is lower than or equal to a signal parameter associated with one of the at least one channel quality parameter.

7. The method of claim 6, wherein the qualifying signal parameter and the signal parameter is at least one of a spectral efficiency and a burst size, a packet size, and a block size.

8. The method of claim 4, further comprising decreasing the first channel quality parameter by the correction parameter to estimate the second channel quality parameter when the qualifying transmission unit is associated with the correct reception, wherein a qualifying signal parameter associated with the qualifying transmission unit is higher than or equal to a signal parameter associated with one of the at least one channel quality parameter.

9. The method of claim 8, wherein the qualifying signal parameter and the signal parameter is at least one of a spectral efficiency and a burst size, a packet size, and a block size.

10. The method of claim 1, wherein at least one of the first channel quality parameter, the second channel quality parameter, and the at least one channel quality parameter is one of a Physical Carrier to Interference and Noise Ratio (PCINR), an Effective CINR (ECINR), a Carrier to Interference Ratio (CIR), a Carrier-to-Noise Ratio (CNR).

11. The method of claim 1, wherein the correction parameter is computed based on the first channel quality parameter and an error rate related to the communication link.

12. The method of claim 11, wherein the error rate is one of a burst error rate, a packet error rate, and a block error rate.

13. The method of claim 1, wherein a transmission parameter of the at least one transmission parameter is at least one of a target error performance for the communication link, a Quality of Service (QoS) requirement for the communication link, a type of communication, an Automatic Repeat Request (ARQ) parameter for the communication link, a Hybrid ARQ (HARQ) parameter for the communication link, an error rate associated with a transmission unit transmitted over the communication link, and a size of the transmission unit, wherein the transmission unit is one of a transmission burst, a transmission packet, and a transmission block.

14. The method of claim 1, wherein a transmission parameter of the at least one transmission parameter is associated with one of a voice connection, a video connection, and a data connection.

15. The method of claim 1, wherein the communication link is one of a DownLink (DL) and an UpLink (UL).

16. The method of claim 1, wherein scheduling the transmission mode comprises selecting a transmission mode corresponding to the second channel quality parameter.

17. The method of claim 1, further comprising:
determining a first transmission type of the communication link used over a predefined time period; and
transmitting a reference transmission unit associated with a second transmission type over the communication link, wherein the reference transmission unit is one of a reference burst, a reference packet, and a reference block.

18. The method of claim 17, wherein the wireless communication network is of Multiple Input Multiple Output (MIMO) type.

19. The method of claim 17, wherein at least one of the first transmission type and the second transmission type is one of a spatial multiplexing type and a Space Time Block Coding (STBC).

20. The method of claim 1, wherein the transmission mode comprises at least one of a Modulation and Coding Scheme (MCS), a repetition rate, and a spatial rate.

21. The method of claim 1, further comprising:
deleting previously computed correction parameters if transmission units over a period are not identified as qualifying transmission units.

22. An apparatus for link adaptation in a wireless communication network, wherein the apparatus is connected to a mobile station (MS) using a communication link, the apparatus comprising:
a processor configured to:
compute a first channel quality parameter based on at least one channel quality parameter associated with the communication link at a predefined interval;
identify and transmit a qualifying transmission unit via the communication link;
upon an indication of the qualifying transmission unit, compute a correction parameter based on the first channel quality parameter and at least one transmission parameter, wherein the at least one transmission parameter is associated with the communication link; and
schedule a transmission mode of the communication link based on a second channel quality parameter, wherein the second channel quality parameter is estimated based on the first channel quality parameter and the correction parameter; and
a transceiver configured to communicate the qualifying transmission unit with the MS.

23. The apparatus of claim 22, wherein the processor is further configured to identify whether the qualifying transmission unit is associated with an error or with a correct reception.

24. The apparatus of claim 23, wherein the processor is further configured to increase the first channel quality parameter by the correction parameter to estimate the second channel quality parameter when the qualifying transmission unit is associated with the error, and wherein a qualifying signal parameter associated with the qualifying transmission unit is lower than or equal to a signal parameter associated with one of the at least one channel quality parameter.

25. The apparatus of claim 24, wherein the qualifying signal parameter and the signal parameter is at least one of a spectral efficiency and a burst size, a packet size, and a block size.

26. The apparatus of claim 23, wherein the processor is further configured to decrease the first channel quality parameter by the correction parameter to estimate the second channel quality parameter when the qualifying transmission unit is associated with the correct reception, wherein a qualifying signal parameter associated with the qualifying transmission unit is higher than or equal to a signal parameter associated with one of the at least one channel quality parameter.

27. The apparatus of claim 26, wherein the qualifying signal parameter and the signal parameter are each at least one of a spectral efficiency and a burst size, a packet size, and a block size.

28. The apparatus of claim 22, wherein the processor is further configured to determine a first transmission type of the communication link used over a predefined time period.

29. The apparatus of claim 28, wherein the transceiver is further configured to transmit a reference transmission unit associated with a second transmission type over the communication link, and wherein the reference transmission unit is one of a reference burst, a reference packet, and a reference block.

30. The apparatus of claim 29, wherein the wireless communication network is of Multiple Input Multiple Output (MIMO) type.

31. The apparatus of claim 22, wherein the apparatus is a base station.

32. The apparatus of claim 22, wherein the processor is further configured to:
- delete previously computed correction parameters if transmission units over a period are not identified as qualifying transmission units.

* * * * *